United States Patent [19]
Persidsky

[11] 3,829,216
[45] Aug. 13, 1974

[54] OPTICAL SYSTEM AND METHOD FOR COUNTING SPERM CELLS
[76] Inventor: Maxim D. Persidsky, 35 Temiscal Ter., San Francisco, Calif. 94609
[22] Filed: Oct. 2, 1972
[21] Appl. No.: 293,992

Related U.S. Application Data
[63] Continuation-in-part of Ser. No. 779,179, Nov. 26, 1968, abandoned.

[52] U.S. Cl.................... 356/36, 350/94, 350/95, 356/38, 356/244, 424/3
[51] Int. Cl..................... G01n 1/28, G02b 21/34
[58] Field of Search ............................ 350/92–95; 424/3; 195/1.8; 356/36, 38, 244, 246, 256

[56] References Cited
UNITED STATES PATENTS
3,005,756  10/1961  Van Demark ............... 195/1.8
3,029,695  4/1962   Wolf ............................. 350/95
3,141,547  7/1964   Newby ....................... 350/95 UX OTHER PUBLICATIONS
Mason, "Examination of Water", John Wiley & Sons, London, 1899, pages 104–109.
Brown, "Dust–Counting Cells", Information Circular, U.S. Dept. of the Interior, July 1945, pages 2–9.
Miller, "A Text of Clinical Pathology", Williams & Wilkins Co. Baltimore, 6th Ed. 1960, pages 12–21 and 820–822.
Chem. Abstracts, Vol. 55, 1961, page 23740.
Vet. Bulletin, Volume 34, No. 2714, 1964, pages 425.
Nature, Vol. 198, No. 4886, June 22, 1963 pages 1221 and 1222.

Primary Examiner—Ronald L. Wibert
Assistant Examiner—F. L. Evans
Attorney, Agent, or Firm—Flehr, Hohbach, Test, Albritton & Herbert

[57] ABSTRACT
Optical apparatus and method for counting sperm cells in a shallow chamber under a microscope. The chamber is formed in a microscope slide and covered by a cover slip provided with reference lines to facilitate counting of the cells.

11 Claims, 7 Drawing Figures

INVENTOR.
Maxim D. Persidsky

OPTICAL SYSTEM AND METHOD FOR COUNTING SPERM CELLS

CROSS-REFERENCE TO RELATED APPLICATIONS

This is a continuation in part of co-pending application Ser. No. 779,179, filed Nov. 26, 1968, now abandoned.

BACKGROUND OF THE INVENTION

This invention pertains generally to optical systems and methods and more particularly to optical apparatus and a method for arranging and counting sperm cells.

In apparatus and methods heretofore known for counting sperm cells, accurate results have been difficult to obtain. This difficulty is largely due to movement of the cells in a specimen, and with specimens large enough to afford a representative count, the movement is generally so great that an accurate count of the entire specimen cannot be made. This movement also precludes accurate results by counting the cells in only a portion of the specimen and extrapolating to determine the count for the entire specimen.

SUMMARY AND OBJECTS OF THE INVENTION

The present invention provides a method and apparatus for limiting the movement of sperm cells so that they can be accurately counted under a microscope. According to the invention, a sperm solution and a primer solution are introduced into a shallow chamber in such manner that a boundary region is formed between the two solutions, both of which contact the top and bottom walls of the chamber. As sperm cells swim from the sperm solution into the primer solution, their heads become sticky, and the cells adhere to the chamber walls where they can be readily counted. Reference lines are provided for dividing the boundary region and area bounded thereby into a plurality of regions of substantially similar size and shape, and a total count can be determined by counting the cells in a single region.

It is in general an object of the invention to provide a new and improved method and apparatus for counting sperm cells.

Another object of the invention is to provide a method and apparatus for limiting movement of sperm cells to permit accurate counting of the cells.

Another object of the invention is to provide a method and apparatus for determining the number of cells in a sperm specimen by counting only a portion of the cell population.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
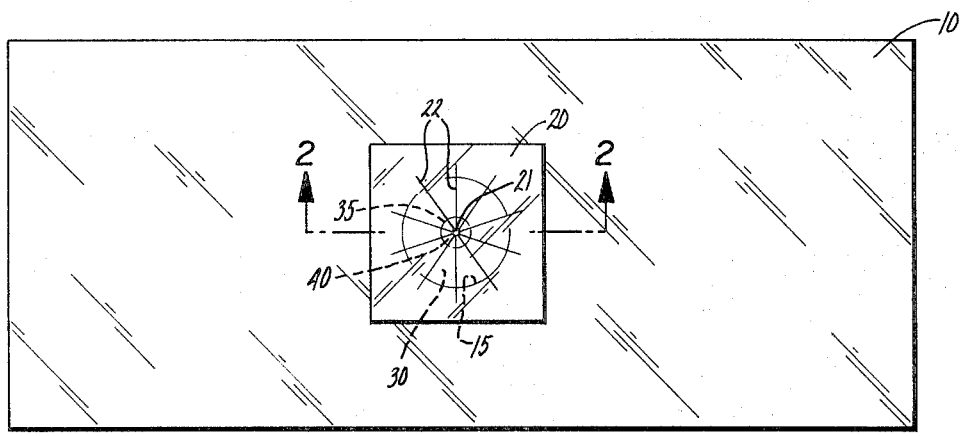
FIG. 1 is a top plan view of one embodiment of the invention.
Figure 2:
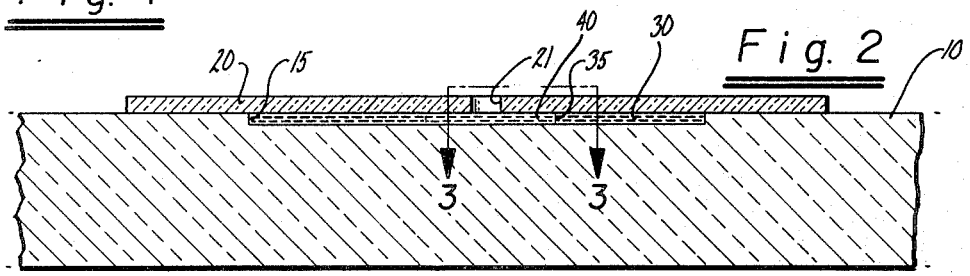
FIG. 2 is an enlarged cross-sectional view, taken along line 2—2 of FIG. 1.
Figure 3:
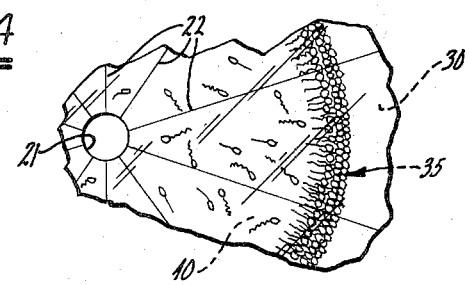
FIG. 3 is an enlarged plan view of one portion of the embodiment shown in FIGS. 1 and 2, taken along line 3—3 in FIG. 2.

As illustrated in FIGS. 1–3, the apparatus includes a transparent glass member 10, such as a microscope slide, in which a shallow counting chamber 15 is formed. The chamber is covered by a transparent member 20, such as a glass cover slip, which rests on the upper surface of the microscope slide around the chamber. If desired, the cover slip can be affixed to the slide by means of a substance such as paraffin oil which will form a seal between the surfaces. A small circular opening 21 is provided in the central portion of the cover slip, and a plurality of reference lines 22 extend radially outward from the opening. The opening preferably has a diameter on the order of 0.1 to 0.2 millimeters, and the lines are formed by conventional means such as etching or scribing.

A primer solution 30 and a sperm solution 40 are introduced into chamber 15. The primer solution is introduced first, and this is most conveniently done before the cover slip is placed in position on the slide. Thereafter, the sperm solution can be introduced into the primer solution through opening 21, and a generally circular boundary region 35 forms between the solutions. The sperm solution remains at the center in a small unit inside boundary region 35, and the primer solution occupies the remainder of the space between the boundary region and the side wall of the cavity. As discussed more fully hereinafter, the primer solution is characterized by the property that the acrasome portion of the heads of sperm cells become sticky when in contact with it. When cells swimming in the sperm solution reach the boundary region and their heads become sticky, they adhere to the top and bottom surfaces of the chamber proximate to the boundary region.

Generally, only sperm cells with progressive motion reach region 35 and adhere to the glass surface. Dead cells and cells with circular or very slow motion remain behind in relatively fixed positions in diluter solution 40. With the cells thus separated and the most active cells anchored to the glass, accurate counting of the cells under a microscope is relatively easy.

While an undiluted sperm specimen can be used as the sperm solution, the number of cells which must be counted in a given area can be substantially reduced by diluting the sperm specimen with a diluter solution. The diluter solution must be one in which the acrasome of sperm cells do not become sticky. Also, because of the possibility that the sperm solution may not be used immediately after preparation, it is desirable that the solution is one in which the sperm cells can live for several days. Proteinaceous solutions are generally well suited for use as the diluter solution. One such solution which gives particularly good results is an egg yolk citrate which comprises by volume approximately 20 percent egg yolk, 5.8 percent sodium citrate solution, and 74.2 percent distilled water. The sodium citrate solution has a concentration of 29.4 percent, and the egg yolk is preferably non-fertilized. The egg yolk citrate solution can be satisfactorily purified by centrifuging for about 20 minutes at 3,000 rpm. The precipitate which forms during the centrifuging is discarded, and the solution is filtered through a conventional millipore filter. If long-term storage of the diluter solution is contemplated, antibiotics can be added. The sperm specimen is generally not added to the diluter solution until shortly before the cells are to be counted.

If only the relative numbers of different types of cells are to be counted, the exact concentration of the diluted sperm solution is not critical, and solution in which sperm is diluted approximately 10 to 20 times will give satisfactory results. An absolute or quantitative count of the cells in a specimen can be made from a portion of the specimen. The portion can be diluted as desired, and total count can be determined accurately as long as the dilution and the relative size of the portion are known.

The primer solution must be one which causes the heads of sperm cells to become sticky. Also, it should be a medium in which sperm cells can survive for at least a short period of time. Generally, non-proteinaceous physiological solutions, such as balanced salt solutions, can be used as the primer solution. Lock's Ringer solution, a balanced salt solution containing sugar, provides particularly satisfactory results.

The surfaces constituting the top and bottom of chamber 15 should be substantially flat and parallel to each other. Best results are obtained when the surfaces are separated by uniform distance in the range of 15 to 50 microns. This separation corresponds generally to the undulation of sperm cells while swimming. The heads of human sperm cells are approximately 4.6 microns long, and their tails are about 50 microns long. When a sperm cell is moving, its head undulates back and forth through a distance of approximately 10 to 50 microns. Thus, if chamber 15 were made deeper than 50 microns, cells could swim past boundary region 35 without striking and adhering to the glass surfaces and thereby be lost to the count.

The side wall of chamber 15 may follow any contour which is convenient, and in the drawing it is shown as being circular. It should be noted that the circular shape of boundary region 35 is not controlled by the outer contour of the chamber but by its shallow depth and the means by which the diluter solution is introduced into the primer solution. The diameter of chamber 15 is likewise not critical, within certain limitations. It must be greater than the diameter of boundary region 35, and since the chamber is substantially filled with primer solution, an upper limit is imposed by the amount of primer solution to be used. In the embodiment illustrated in FIGS. 1–3, for example, the chamber has a diameter on the order of 20 millimeters.

Circular opening 21 provides means for introducing the sperm solution into the primer solution in the chamber when the cover slip is in place. The sperm solution is conveniently introduced into the opening by conventional means such as a micro pipette (not shown), and it is drawn by capillary action into the chamber where it spreads into a circular unit concentric with opening 21.

Reference lines 22 provide means for obtaining an accurate count of the total number of cells in the specimen in the chamber by actually counting only a portion of these cells. The lines intersect at equal angles at the counter of opening 21. Since the boundary region and the body of sperm solution are disposed coaxially of the opening, lines 22 divide the solution and the boundary region into a plurality of sectors of equal size. Since the distribution of sperm cells in sperm solution 40 is substantially symmetrical, the number of cells in the entire specimen can be determined by counting the cells in one or more of the sectors defined by lines 22. The accuracy of the determination increases with the percentage of cells actually counted. This percentage can be increased by increasing either the number of sectors counted or the size of the sectors. I have found that satisfactory results can be obtained where the specimen is divided into ten sectors and the cells in two diametrically opposite sectors are counted.

As mentioned above, in the embodiment shown in FIGS. 1–3, the primer solution is most easily poured into chamber 15 before the cover slip is placed on the slide, and the joint between the cover slip and slide can be sealed to prevent evaporation of the solution in the chamber. After the sperm solution has been introduced, opening 21 can also be sealed.

Figure 4:
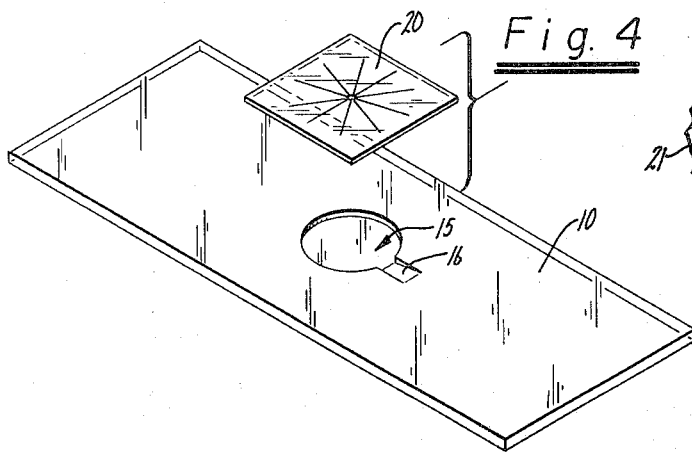
FIG. 4 is an exploded perspective view of a second embodiment of the invention.
Figure 5:
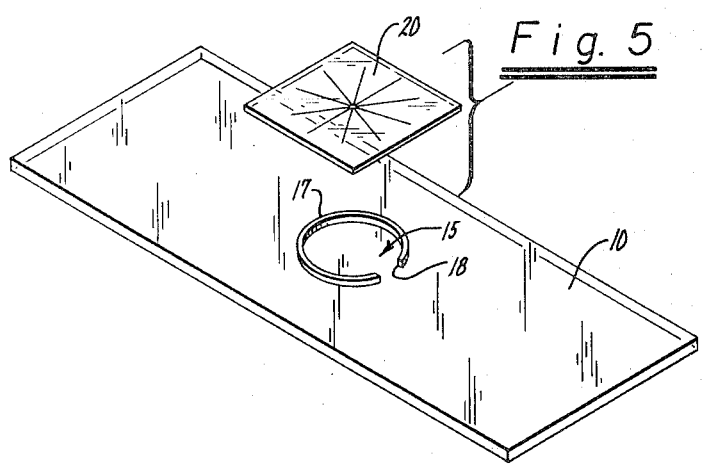
FIG. 5 is an exploded perspective view of a third embodiment of the invention.

In the embodiments shown in FIGS. 4 and 5, means is provided for introducing primer solution into chamber 15 after cover slip 20 has been mounted in place.

In FIG. 4, chamber 15 comprises a flat-bottomed depression in the upper surface of slide 10. A channel 16 is also provided in the upper surface of slide 10, one end of said channel being in communication with chamber 15, the other end extending beyond the edge of cover slip 20 and being open to the atmosphere. Thus, cover slip 20 can be mounted on slide 10 and sealed in place before primer solution is introduced into chamber 15. Once the primer solution is in the chamber, the open end of channel 16 can be sealed. Sealing between slide 10 and cover slip 20 can be facilitated by assuring that the upper surface of slide 10 is substantially flat, except for the depression and channel, and that the lower surface of cover slip 20 is likewise substantially flat.

In the embodiment shown in FIG. 5, chamber 15 is formed by an annular ring disposed between slide 10 and cover slip 20. The lower surface of annular ring 17 can be permanently affixed to the upper surface of slide 10 by suitable means such as cementing. Annular ring 17 includes an opening 18 which permits primer solution to be introduced into chamber 15 after cover slip 20 has been mounted in place and sealed. It is possible to omit opening 18, in which case the primer solution is simply poured into chamber 15 before cover slip 20 is put in place.

At normal room temperatures, it takes approximately 15 minutes for substantially all of the living or motile sperm cells to reach boundary region 35 and adhere to the glass surfaces. This process may be speeded up by warming the assembled slide by conventional means such as a slide warmer. The temperature at which the warming is done must not exceed that at which sperm cells can survive. At a temperature of approximately 37°C, the separation is complete in about 8 minutes.

Once the separation of the sperm cells is complete, the slide assembly is ready for examination under a conventional microscope. A 400 power microscope with dark field or phase contrast illumination is particularly well suited for this application.

Figure 6:
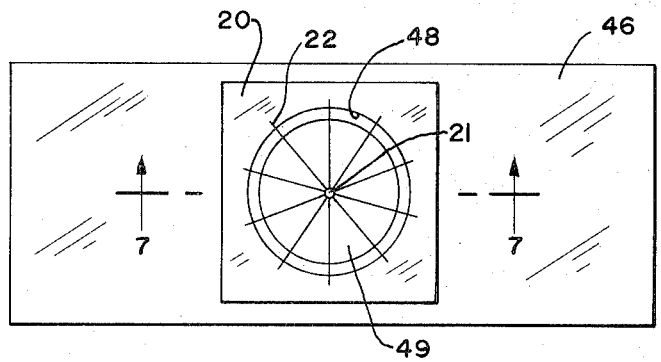
FIG. 6 is a top plan view of a fourth embodiment of the invention.
Figure 7:
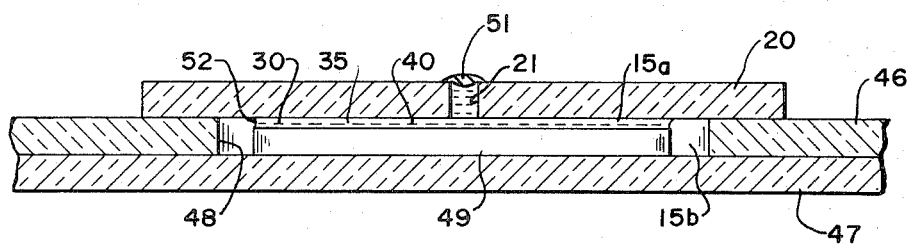
FIG. 7 is an enlarged cross-sectional view of a portion of the embodiment illustrated in FIG. 6, taken along line 7—7 in FIG. 6.

In the embodiment shown in FIGS. 6 and 7, two microscope slides 46 and 47 are laminated together to form the counting chamber. A circular opening 48 extends vertically through slide 46, and the lower surface of this slide is affixed to the upper surface of slide 47 by suitable means such as cementing. A transparent disk-like member 49 is disposed coaxially of opening 48 and affixed to the upper surface of slide 47. This disk-like member has a height on the order of 15 to 50 microns less than the thickness of slide 47 and a diameter on the order of 2 millimeters less than opening 48. In one presently preferred embodiment, for example, opening 48 has a diameter on the order of 12 millimeters, and disk-like member 49 has a diameter on the order of 10 millimeters. In this embodiment, the counting chamber has a shallow central portion 15a having a depth on the order of 15 to 50 microns surrounded by an annular channel 15b on the order of 1 millimeter wide. Cover slip 20 rests on the upper surface of slide 46, with opening 21 disposed coaxially of the chamber. Primer solution 30 and sperm solution 40 are introduced into the chamber, as in the previous embodiments, forming a generally circular boundary region 35 coaxially of opening 21. This opening can be sealed by suitable means such as a drop of paraffin oil 51 to prevent evaporation or flow in the solutions. As the chamber is filled, channel 15b, being filled with air, interrupts the capillary flow of the solutions, and a meniscus 52 forms near the inner edge of the channel. This prevents the solutions from entering the channel or escaping between the cover slip and slide, and the surface tension of the meniscus draws the cover slip tightly against the slide. Vapors from the solutions concentrate in the channel and retard evaporation and drying out of the solutions which might otherwise cause undesired movement or flow in the liquid. No oil or other sealing substance is required around the outer periphery of the chamber. The cover slip is dry fitting, thereby providing a neater and more accurate apparatus in which the volume of the counting chamber cannot be affected by the thickness of sealer used between the cover slip and slide. This permits accurate counts to be made on a cells per volume basis.

The invention has a number of important features and advantages. It provides an efficient and effective method and apparatus for separating and counting sperm cells according to their motility. It permits accurate counts to be made for different types of cells, such as very active cells, less active cells, dead cells, and cells with rotary motion. It can also be used to measure the time required for a desired type of cell such as active cells with progressive motion to reach the boundary region, thereby providing an index of cell activity. This is a new parameter which is useful for characterizing semen. The invention has been found to provide a reproduceability of ±1 percent in determining cell motility, as compared with ±10 percent with techniques heretofore known.

It is apparent from the foregoing that a new and improved method of apparatus for counting sperm cells has been provided. While only the presently preferred embodiments have been described herein, as will be apparent to those familiar with the art, certain changes and modifications can be made without departing from the scope of the invention as defined by the following claims.

I claim:

1. In apparatus for counting cells in a sperm solution, a chamber having rigid top and bottom walls spaced apart by a distance on the order of 15 to 50 microns, said top wall being transparent and having an opening in the central portion thereof, a body of sperm solution disposed in said chamber coaxially of said opening, said sperm solution contacting the top and bottom walls of said chamber, and a body of nonproteinaceous primer solution surrounding the body of sperm solution and forming a generally circular boundary region therewith, said primer solution also contacting the top and bottom walls of said chamber and being characterized by the property that the heads of sperm cells become sticky when in contact therewith.

2. Apparatus as defined by claim 1 wherein said top wall is provided with a plurality of lines extending radially from said opening for visually dividing the boundary region and the region bounded thereby into a plurality of sector-shaped regions.

3. Apparatus as defined by claim 1 wherein said chamber is formed by a first glass member having a planar upper surface with a shallow substantially flat-bottomed cavity formed therein and a second glass member having a planar lower surface engaging the upper surface of said first member around said cavity.

4. Apparatus as defined by claim 1 wherein said chamber is formed by first and second spaced apart glass members having substantially parallel upper and lower surfaces, respectively, and an annular side wall member extending between said upper and lower surfaces.

5. Apparatus as defined by claim 1 wherein the chamber includes an inner region having a depth on the order of 15 to 50 microns and an annular channel surrounding the central region, said channel being disposed coaxially of said region and in communication therewith.

6. In a method for counting sperm cells, the steps of placing a first solution in a chamber having rigid top and bottom walls spaced apart by a distance on the order of 15 to 50 microns, said solution being a nonproteinaceous solution characterized by the property that the heads of sperm cells become sticky when in contact therewith, introducing a quantity of sperm solution into the first named solution in such manner that said sperm solution is in contact with said top and bottom walls and a boundary region is formed between the two solutions, and leaving said solutions in the chamber until substantially all of the living sperm cells in the sperm solution reach said boundary region, whereupon their heads become sticky and adhere to said walls upon contacting the same.

7. A method as in claim 6 together with the additional step of warming the solutions in the chamber to a predetermined temperature.

8. A method as in claim 7 wherein the solutions are warmed to a temperature on the order of 37°C.

9. A method as in claim 6 wherein the sperm solution is introduced into the first solution in such manner that the boundary region formed between the solutions is substantially circular in shape.

10. A method as in claim 9 together with the additional steps of visually dividing the circular boundary region and region bounded thereby into a plurality of sectors and counting the cells in at least one of said sectors.

11. A method as in claim 6 together with the additional step of preparing the sperm solution by diluting the sperm specimen on the order of 10 to 20 times with a diluter solution.

* * * * *